United States Patent [19]

Compere

[11] E Re. 29,705

[45] Reissued Jul. 18, 1978

[54] RUPTURABLE BLISTER PILL PACKAGE WITH SAFETY BACKING

[76] Inventor: Newton L. Compere, 3202 Heiden Dr., Lake Bluff, Ill. 62621

[21] Appl. No.: 683,091

[22] Filed: May 4, 1976

Related U.S. Patent Documents

Reissue of:

[64] Patent No.: 3,809,221
Issued: May 7, 1974
Appl. No.: 296,192
Filed: Oct. 10, 1972

[51] Int. Cl.[2] ..... B65D 83/04

[52] U.S. Cl. ..... 206/531; 206/469; 206/471; 206/484.2; 206/532; 206/538

[58] Field of Search ..... 206/530, 531, 532, 538, 206/539, 443, 461, 467, 469, 471, 484, 498

[56] References Cited

U.S. PATENT DOCUMENTS

| | | | |
|---|---|---|---|
| 2,415,859 | 2/1947 | Ancker | 206/539 |
| 2,897,962 | 8/1959 | Zackheim | 206/443 |
| 2,968,391 | 1/1961 | Sparks | 206/532 |
| 3,054,503 | 9/1962 | Hartman, Jr. et al. | 206/531 |
| 3,419,137 | 12/1968 | Walck | 206/484 |
| 3,503,493 | 3/1970 | Nagy | 206/539 |
| 3,621,992 | 11/1971 | Osborne | 206/539 |
| 3,630,346 | 12/1971 | Burnside | 206/461 |
| 3,650,390 | 3/1972 | Chung | 206/498 |
| 3,682,366 | 8/1972 | Chung | 206/498 |
| 3,835,995 | 9/1974 | Haines | 206/539 |

*Primary Examiner*—George E. Lowrance
*Assistant Examiner*—Bruce H. Bernstein
*Attorney, Agent, or Firm*—Richard H. Anderson

[57] ABSTRACT

A rupturable press-through blister type medicament or pill package is "childproofed" by securing a strong flexible polymeric backing sheet, such as polyethylene terephthalate, over the rupturable sheet in such a manner that the pill cannot be forced through the package unless the backing sheet is first peeled off.

15 Claims, 4 Drawing Figures

FIG.1
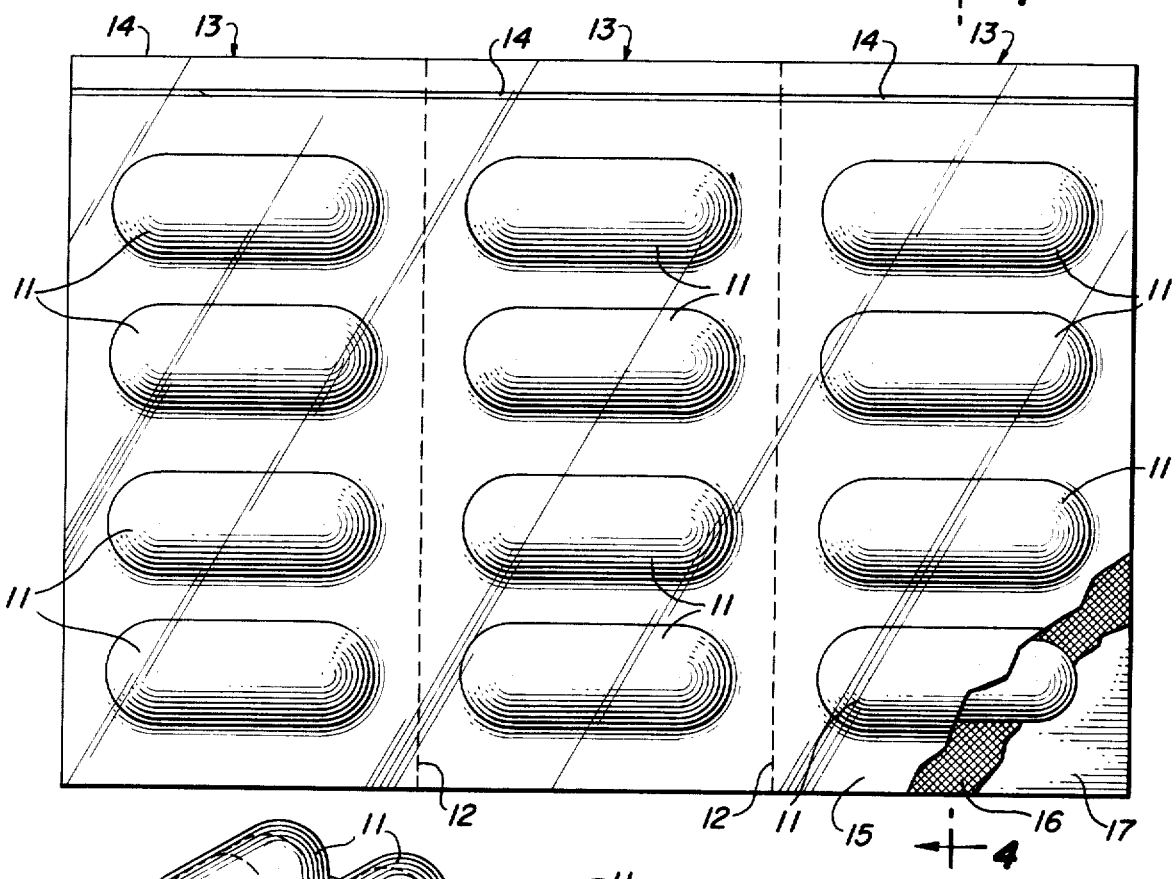
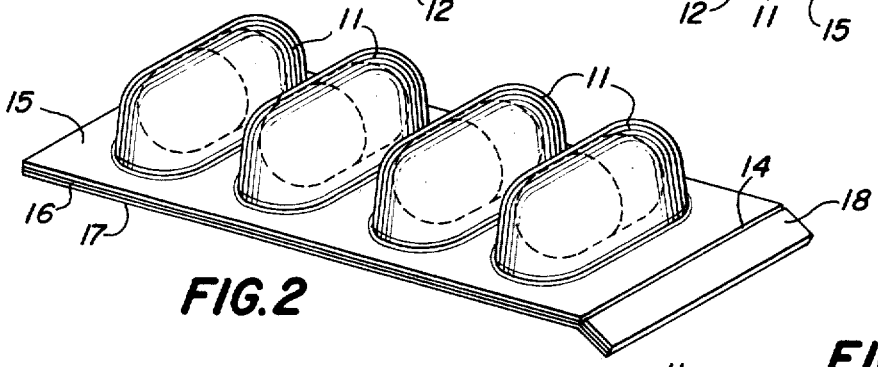
FIG.2
FIG.3
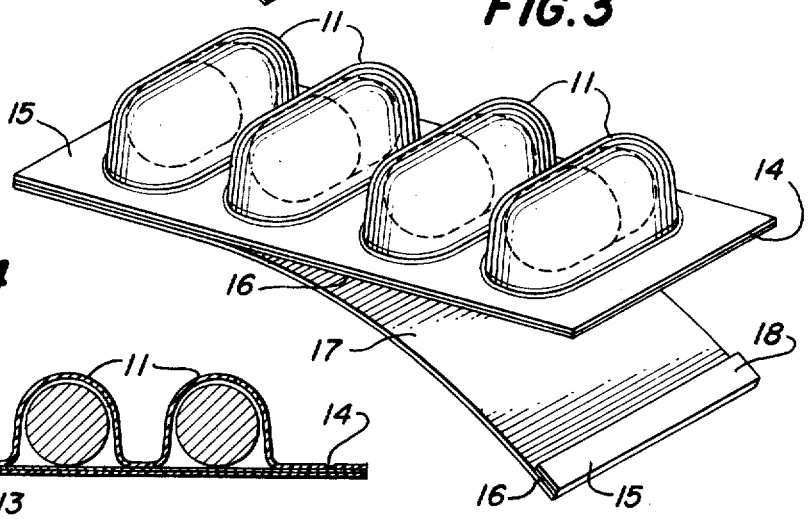
FIG.4
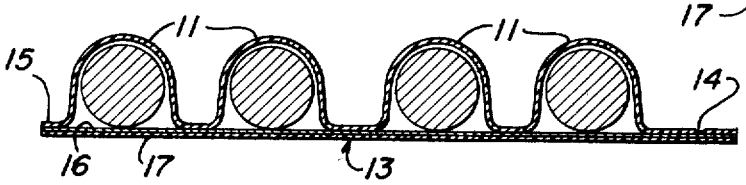

RUPTURABLE BLISTER PILL PACKAGE WITH SAFETY BACKING

Matter enclosed in heavy brackets [ ] appears in the original patent but forms no part of this reissue specification; matter printed in italics indicates the additions made by reissue.

The present invention relates to a safety blister-type package for enclosing medication or pills. One of the problems which faces today's parents is in keeping medication or pills beyond the reach of their children. Children do not have the ability to recognize the risk involved in consuming unprescribed medication. Because of this fact, there is an urgent need for a package from which pills are readily accessible to the adult, but not accessible to the child.

One object of the present invention is to provide a "childproof" pill package which can be easily opened by one who has been given instructions on how to do so, but cannot be opened by the uninstructed child.

Another object of the present invention is to provide a pill package which, when opened, makes only one dosage of pills accessible to the user, which dosage, of course, is less than a lethal dosage.

Another object of the present invention is to provide a pill package in which any desired number of pills can be made accessible upon opening.

Another object of the present invention is to provide a pill or medication dispensing package in which each pill or dosage of medication is almost entirely visible to the user.

Another object of the present invention is to provide a pill package in which one pill or one dosage of pills can be removed from the package while the remaining pills are maintained in an air-tight enclosure.

Another object of the present invention is to provide a pill package in which the use of cumbersome bottles is not required.

Another object of the present invention is to provide a pill package in which each individual pill can be separately packaged so that the desired dosage can be carried by the user without the necessity of carrying excess pills.

Another object of the present invention is to provide a pill package which requires additional package opening to remove each additional pill.

Another object of the present invention is to provide a safety pill package which the child cannot open without the aid of tools.

Another object of the present invention is to provide a pill package in which opening of the package makes accessible a less than dangerous number of units of medication. The number of units exposed upon each opening of the package can be varied depending upon the toxicity of the packaged medication.

BACKGROUND OF THE INVENTION

Press-through packs or blister packs are commonly used today to package units of medication or pills for oral ingestion. The press-through package is made up of a first sheet, typically a clear, preformed polyvinyl chloride or polystyrene with flexible bubbles which form separate compartments for one or more pills; and a second rupturable sheet material, like an aluminum, foil or paper sheet, which has been attached to the first sheet. The metal foil is attached by heat-sealing, solvent welding, gluing, or otherwise adhering the foil sheet to the blister sheet. The tablet is removed from the blister compartments by pressing on the flexible blister which in turn presses the tablet against the foil, rupturing the foil, and ejecting the tablet.

It is sometimes desirable in making such a press-through package to include between the first and second sheets a rigid tray in which there are holes which coincide with the blisters in said first sheet. The rigid tray is used to protect the pills from contamination and mechanical damage and may contain printed instructions as to the type of pill or the time a particular dosage is to be taken and with an indication of the dosage that has already been taken.

The recent trend in the packaging of medication has been to provide packages which will be safe, even if found by children. Most developments in the "childproofing" line have been directed to the improvement in pill bottles. In this regard, safety caps have been devised which require a certain series of pushes and turns in order to open the bottle. However, there has been little development in the area of "childproofed" press-type blister packages with which this invention is concerned.

PRIOR ART

Prior art packages which have used more than one backing layer on a press-through blister-type package have not used a layer of backing material which cannot be ruptured. The prior art backing layers which have been used to cover the rupturable layer have been made from paper or foil and may have been scored or weakened so that all backing layers can be ruptured prior to pressing a pill through the package. These additional prior art backing layers have been used for the purpose of providing printed information on the back of the pill package and for additional sealing engagement to protect the pills from the environment. For example, see the following patents: Nagy-U.S. Pat. No. 3,503,493; Osborn-U.S. Pat. No. 3,621,992; Sorensen-U.S. Pat. No. 2,317,860; and Heller-U.S. Pat. No. 3,387,699. In each of these patents the multiple backing layers used on the blister or press-through type pill package can be easily ruptured or peeled away and are not strong enough to provide "childproofing".

One attempt at "childproofing", a blister-type pill package, can be seen in the Helstrom U.S. Pat. No. 3,472,368. In this patent, there is no second backing member which is peeled away to expose the rupturable layer as will be disclosed in describing the present invention. This package is supposedly "childproofed" simply by providing a rupturable sheet which is very difficultly ruptured. The Helstrom patent, therefore, relies on the child's weakness as the necessary element to prevent him from opening the package.

FIELD OF THE INVENTION

The present invention was developed with the idea of providing a pill package which requires knowledge of the package opening procedure rather than a minimum amount of strength for opening said package. The person who is likely to be taking pills is not generally in a very strong physical condition. Quite often, the strength of a child is greater than the strength of the person who is ill and most likely to be taking pills. Because of this fact, this invention was developed to provide a pill package which can be opened by the instructed adult who may have no more strength than the average child. The child who is uninstructed on the opening of the herein disclosed package will not be able to reach the package contents. The present invention, therefore, relies on the superior knowledge of the adult rather than his superior strength in order to make a package which is easily opened by the adult but cannot be opened by the child.

The present invention is concerned with a safety press-type blister package which is similar to the common blister package, but which has a sheet or film of a strong flexible polymer which covers the rupturable sheet. The strong flexible polymeric backing sheet is secured to the back of the package over the rupturable sheet in such a manner that when secured, the backing sheet is not pushed away from the foil when pressure is put on the blister-side of the pill package in an attempt to push the pill through the package. In other words, for the user to be able to push a pill through the rupturable sheet, the strong plastic backing sheet must first be removed. So long as the required adherence is obtained, the strong backing sheet can be secured to the rupturable sheet side of the blister packet by heat sealing, solvent welding, gluing or otherwise adhering the two sheets together. A preferred method is by heat-sealing.

In heat-sealing, the strong plastic backing sheet can be secured to the rupturable sheet at the same time as the first or blister sheet is heat sealed thereto. After securing the three sheets together, the plastic backing sheet cannot be forced to disengage the rupturable sheet by applying pressure on the pill from the blisterside of the packet. However, the strong plastic backing sheet can readily be peeled from the back of the package so that the rupturable sheet is exposed. Once the rupturable sheet is exposed, the user can easily gain access to the package contents by putting pressure on the pill from the blister side of the package and thereby forcing the pill through the rupturable sheet. The plastic backing sheet, therefore, cannot be sealed to the rupturable sheet in such a manner that the average user will not be able to peel it from the back of the package. Further, the seal must be strong enough so that when pressure is applied to the blister, the flexible polymeric backing sheet remains in contact with the rupturable sheet. Further, the polymeric backing sheet must be strong enough so that with the polymeric backing sheet engaged, a pill cannot be forced through the package by putting pressure on the pill from the blister side of said package.

A strong plastic which has been found particularly effective when heat-sealed to the back of a common press-through pill package is polyethylene terephthalate. However, any plastic with strength sufficient to prevent a pill from being hand-forced therethrough can be used for this purpose.

A weakened severance line is provided across any edge of the package (top, bottom or either side). The weakened severance line is made in both the blister sheet and the rupturable sheet but does not affect the backing sheet.

The weakened severance line is provided by making a perforated score line, thinner portion, or the like, which extends across any edge of the package. This weakened severance line extends through both the blister sheet and rupturable sheet so that when the package is angulated or flexed (FIG. 2) at the line of weakening, the forces cause the blister sheet and rupturable sheet to be severed at the line of weakening. The line of weakening in both the blister sheet and the rupturable sheet are preferably aligned so that severance of each sheet occurs by angulating the package along only one line. The severed blister and rupturable sheets, however, are still bonded to the backing sheet and together with said backing sheet, act as a tab (see FIG. 3, number 18) for peeling the backing sheet from the package.

The weakened severance line is preferably positioned along a shorter edge of the package so that when the backing sheet is peeled, the rupturable sheet is exposed at the back of only one blister at a time (see FIG. 3). Taking into account the persistence and endurance of a child who has made up his mind to open the package, the weakened severance lines can be made severable only by a series of angular back-and-forth flexing at said severance lines. In this regard, only a few short perforations need be made to create severability for the instructed adult. Further, rather than a line of intermittent perforations, only a crushing force need be applied to create a line of weakening in that the blister sheet and rupturable sheet will be made thinner along the line of crushing. The crushing force will cause a decrease in strength of the blister and rupturable strength so that severance will occur with back-and-forth angular flexing at said severance line. Of course, the smaller the weakening effect along the severance line, the safer the package and the more difficult the package will be for the adult to open. It is within the skill of the art to create a severance line in accordance with the above disclosure which makes the package prohibitively difficult for the uninstructed child to open, but is not unduly burdensome for the adult to open.

Given instructions on how to peel off the backing sheet, the user can then flex or bend the top edge of the package along the line of weakening so that the blister sheet and rupturable sheet becomes severed along the weakened severance line. By grasping this separated tab or edge of the package and tearing downward parallel to the back-side of the package, the user can peel off the strong flexible polymeric backing sheet and thereby expose the rupturable sheet. The rupturable sheet can then be penetrated by applying force to the blister side of the package, and forcing the pill therethrough.

DETAILED DESCRIPTION OF PREFERRED EMBODIMENTS

FIG. 1 describes the finished pill package arranged with three individual tear off packets each containing four pills. Of course, any arrangement can be made containing the desired number of pills, or each pill can be individually packaged. Each blister 1 can be shaped to conform to the shape of the particular medicament or pill which is placed therein. The severance lines 2 between each pill packet 3, are easily torn and are provided for convenience, for example, to provide packets containing a daily requirement of four pills. Each packet has a weakened severance line 4 in both a blister sheet 5 and a rupturable sheet 6 but not in a backing sheet 7.

FIG. 2 describes the blister pill packet of FIG. 1 which has been torn from the overall package. The edge of the packet having the line of weakening has been angulated or flexed to sever the blister sheet 15 and the rupturable sheet 16 along the line of severance to create a tab 18 which is used to peel the backing sheet 17 from the packet and expose the rupturable sheet 16. Once the rupturable sheet has been exposed by peeling the backing sheet away from the package, the medicament or pill contained within the blister can be forced through rupturable sheet 16 by applying pressure to the top of the flexible blister 11.

FIG. 3 describes a pill packet in which the safety backing sheet 17 is being peeled from the package in accordance with directions furnished to the adult. Tab 18 which results from severance of the blister sheet 15 and rupturable sheet 16 along the line of weakening 14 is composed of all three sheets 15, 16, and 17 sealed together. This tab 18 is convenient for getting a good grip on safety backing sheet 17 for peeling sheet 17 from the back of the package.

FIG. 4 shows a cross-section of the package shown at FIG. 1 cut across reference line 4—4 through the blister 11 of one of the packets 13 showing the backing sheet 17, the rupturable sheet 16, and the blister sheet 15 sealed together. In this figure, the line of weakening 14 can be readily seen. As shown, the line of weakening does not completely penetrate the blister sheet, but as mentioned, a line of intermittant cuts can be provided through both the blister sheet 15 and the rupturable sheet 16. This is usually done after the rupturable sheet and blister sheet have been partially sealed together and before the backing sheet is put on and the entire package completely sealed.

The package as described herein complies with standards of the Poison Prevention Packaging Act, 21, CFR 295.1, which describes the test procedures in which the packages are given to children for a given period of time to determine accessibility of the packaging contents.

It should be understood that it is also possible to provide printing on the foil or backing sheet which contains any desired information such as a description of the item contained within the blister, and numbers or dates for sequential dosages. In this regard, the package can be calendarized as commonly seen in oral contraceptive packages and in fact can be used to package oral contraceptives. Of course, the package need not be in a rectangular form as shown in the drawings. The package can be circular having severance lines between individual pill packets which extend from the center of the circular package forming pie-shaped individual packets containing as many items as desired. In this manner, any desired shape can be used with severance lines between individual packets placed to give individual packets containing as many items as desired.

While the present invention has been described with reference to a medicament or pill, it can also be used to make a child-resistant package for capsules, tablets, troches, suppositories, etc.

What is claimed as new and desired to be secured by Letters Patent of the United States is:

1. A protective childproof package comprising:

a first sheet having at least one flexible blister which forms a compartment, said at least one blister being adapted to receive a *solid* medicament; said first sheet having a line of weakening along one edge;

a second sheet of rupturable material *coextensive with said first sheet having no perforations above said compartment, and* secured *along its entire surface, except below said blister,* to the first sheet, closing and sealing said compartment formed by the blister in the first sheet; and having a line of weakening along one edge so that when secured to the first sheet, the line of weakening in said first and second sheets are on the same edge of the package; and a third imperforate sheet *coextensive with said second sheet and* sealably secured *along its entire surface* to the second sheet which third sheet has sufficient strength so that it can neither be ruptured nor forced out of engagement with the second sheet when force is applied to the medicament from the blister side of the package.

2. A protective childproof package as defined in claim 1 wherein the second sheet is a metal foil.

3. A protective childproof package as defined in claim 1 wherein the second sheet is paper.

4. A protective childproof package as defined in claim 1 wherein the first sheet is polystyrene.

5. A protective childproof package as defined in claim 1 wherein the first sheet is polyvinyl chloride.

6. A protective childproof package as defined in claim 1 wherein the third sheet is polyethylene terephthalate.

7. A protective childproof package as defined in claim 1 wherein the line of weakening in the first and second sheets are a line of intermittent perforations in said sheets.

8. A protective childproof package as defined in claim 1 wherein the line of weakening in the first and second sheets are a line of thinness in both the first and second sheets.

9. A protective childproof package as defined in claim 1 wherein the third sheet is secured to the second sheet by heat-sealing.

10. A protective childproof package as defined in claim 7 wherein the third sheet can be peeled from the second sheet after severing the first and second sheets along the line of weakening.

*11. A protective childproof package comprising:*

*a first sheet having at least one flexible blister which forms a compartment, said at least one blister being adapted to receive a solid medicament;*

*a second sheet comprising a rupturable material, secured to the first sheet and having no perforations above said compartment, closing and sealing said compartment formed by the blister in the first sheet;*

*a third sheet coextensive with said second sheet and sealably secured along its entire surface to the second sheet, which third sheet has sufficient strength so that it can neither be ruptured nor forced out of engagement with the second sheet when force is applied to said medicament from the blister side of the package; and*

*means for removing said third sheet so that the medicament can be removed from the package.*

*12. A protective childproof package as defined in claim 11 further including*

*a line of weakening in said first sheet such that when said first sheet is severed along said line of weakening, said third sheet can be grasped separately from said first sheet for removal of said third sheet.*

*13. A protective childproof package as defined in claim 12 further including a line of weakening in said second sheet.*

*14. A protective childproof package comprising:*

*a first sheet having at least one flexible blister which forms a compartment, said at least one blister being adapted to receive a solid medicament; said first sheet having a line of weakening along one edge;*

*a second sheet of rupturable material, coextensive with said first sheet and having no perforations above said compartment, and secured along its entire surface, except below said blister, to the first sheet, closing and*

*sealing said compartment formed by the blister in the first sheet; and having a line of weakening along one edge so that when secured to the first sheet, the line of weakening in said first and second sheets are on the same edge of the package; and*

*a third sheet coextensive with said second sheet and sealably secured along its entire surface to the second sheet which third sheet has sufficient strength so that it can neither be ruptured nor forced out of engagement with the second sheet when force is applied to said medicament from the blister side of the package.*

*15. A protective childproof package comprising:*

*a first sheet having at least one flexible blister which forms a compartment, said at least one blister being adapted to receive a solid medicament;*

*a second sheet comprising a rupturable material, coextensive with said first sheet and having no perforations above said compartment, and secured to the first sheet, closing and sealing said compartment formed by the blister in the first sheet;*

*a third sheet coextensive with said second sheet and sealably secured along its entire surface to the second sheet, which third sheet has sufficient strength so that it can neither be ruptured nor forced out of engagement with the second sheet when force is applied to said medicament from the blister side of the package; and*

*means for obtaining access to said third sheet such that said third sheet can be grasped separately from said first sheet for removal of said third sheet from the package.*

* * * * *

UNITED STATES PATENT OFFICE

CERTIFICATE OF CORRECTION

Patent No. RE 29705 Dated July 18, 1978

Inventor(s) Newton L. Compere

It is certified that error appears in the above-identified patent and that said Letters Patent are hereby corrected as shown below:

Claim 1, line 7 should read "said first sheet and having no perforations above said com-"

Claim 11, lines 6 - 8 should read "to the first sheet, closing and sealing said compartment formed by the blister in the first sheet and having no perforations above said compartment;"

Signed and Sealed this

*Twentieth* Day of *February 1979*

[SEAL]

*Attest:*

RUTH C. MASON
*Attesting Officer*

DONALD W. BANNER
*Commissioner of Patents and Trademarks*